(No Model.)
W. H. MELANEY.
CAR AXLE.
No. 405,428. Patented June 18, 1889.
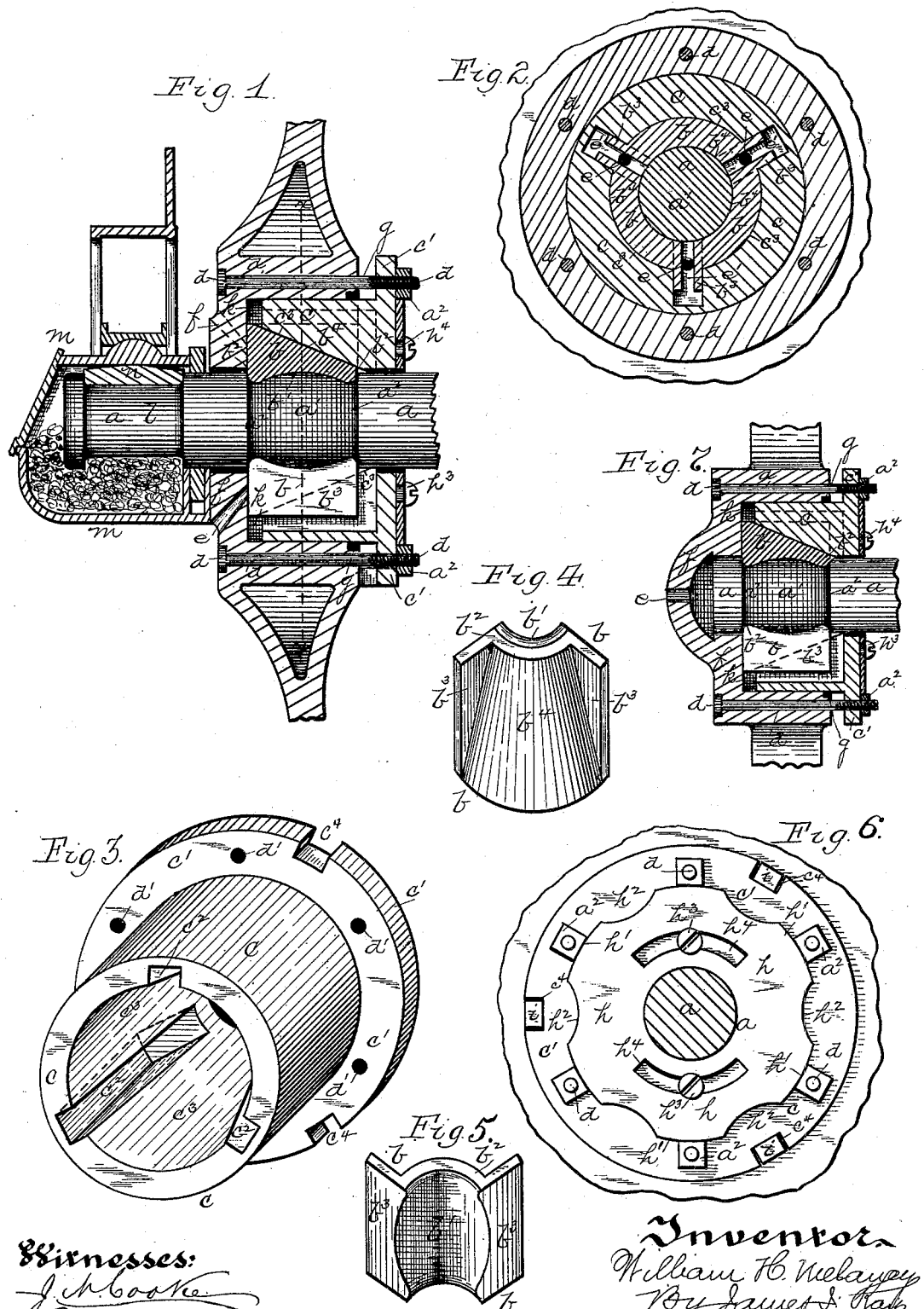
Witnesses:
J. M. Cooke
Rob¹ D. Totten
Inventor
William H. Melaney
By James D. Kay
Attorneys

United States Patent Office.

WILLIAM H. MELANEY, OF PITTSBURG, ASSIGNOR OF ONE-HALF TO ROBERT C. TOTTEN, OE ALLEGHENY, PENNSYLVANIA.

CAR-AXLE.

SPECIFICATION forming part of Letters Patent No. 405,428, dated June 18, 1889.

Application filed July 9, 1888. Serial No. 279,397. (No model.)

*To all whom it may concern:*

Be it known that I, WILLIAM H. MELANEY, a resident of Pittsburg, in the county of Allegheny and State of Pennsylvania, have invented a new and useful Improvement in Car-Axles; and I do hereby declare the following to be a full, clear, and exact description thereof.

My invention relates to car axles and wheels, and more especially to a means of securing the wheels to the axles so that they will move loosely thereon. The method most commonly employed for securing the wheels to the axles is to drive the wheels on the axles by hydraulic pressure, so that they are rigidly secured to the axle and have no revolution independent of the axle, but both revolve together, said axle being journaled in suitable bearings in the axle-box, and in which is furnished the necessary lubricant. This manner of securing the wheels to the axle is attended with many objections, the chief of which is encountered where the wheels are rounding a curve. It is a well-known fact that when a train of cars is going around a curve the outer wheels of said cars will have a greater distance to travel than the inner wheels, and unless the outer wheels are of a greater diameter than the inner ones the outer wheels should travel more rapidly than the inner ones; but as the wheels are held rigidly by the axles this difference in rotation is prevented, and consequently there will be a slipping and sliding of the outer wheels on the face of the rail, and for this reason the life of the rails on a curve is shorter than of those on the straight road-bed, while the wear on the tread and flange of the wheel is also greatly increased. Attempts have been made to overcome this difficulty by the employment of wheels with conical tread thereon, on the principal that as the wheels turn the curve the outer ones will be forced out, so that the flange will come in close contact with the inside head of the rail, and owing to its conical surface the circumference of the wheel will be increased, while the inner wheels will be drawn in the direction of the outer wheels, so that said inner wheels will be running on the part of the tread farthest from the flange, thereby proportionately decreasing the circumference of said wheels. The result obtained from the change of circumference of the wheels is so slight that there is scarcely any appreciable advantage in the use of the conical tread. Owing to the great amount of friction created by this slipping and sliding of the wheels on the rails, a greater amount of power is necessary in drawing the cars, while the axles are also subjected to a severe torsional strain, for as they are rigidly secured to the wheels the axles of each truck must always be parallel with each other, and as the outer wheels slip and slide the axles consequently cannot be radial to the curve, and the result is a severe strain on the axles. To obviate these difficulties many devices for adjusting the wheels loosely on the axles have been employed, but these have all been inefficient, owing to the employment of an axle with a straight bearing. Where the straight bearing is used, the wheels are journaled between square shoulders, and there is always a certain amount of lateral movement or wabble of the wheels on the journal, so that instead of the tread and flange of the wheels wearing away, as is the case with the tight wheels, the wear will come on the inside of the hub of the wheel, and there is no means of taking up this wear on the journal or of tightening the wheels thereon to prevent this wearing away of the same, while the bearing is also thrown on a strain, for the flange of the wheel in turning a curve strikes the head of the outside rail with such force as to tend to cant the wheel on the bearing, thus throwing the whole weight on a small point of the bearing, causing thereby a greater amount of friction, and consequently a more rapid and frequent heating of the journal of the axle. Experience has shown that the lateral movement to which the axles are subjected will wear them away at their journals, and grooves or depressions will be formed in said journals, which will tend to weaken the strength of the axles.

Another objection to the use of the loose wheel heretofore has been the difficulty of furnishing a means of supplying the journals of the axles or hub of the wheel with a sufficient quantity of oil or other lubricant to prevent the heating of the journals and consequent delay and labor occasioned thereby.

The object of my invention, therefore, is to provide a means of attaching the wheels loosely to the axles, so that in rounding curves the slipping and sliding of the outer wheels will be avoided, and they can make a greater number of revolutions than those on the inside curve, thus avoiding the friction due to the slipping on the rail, while the axle will be relieved of the severe torsional strain, and the lateral movement of the wheel on the journal is prevented.

The object of my invention, further, is to provide a means of supplying the requisite amount of oil to prevent a "hot journal," and, further, to provide for the employment of a loose wheel journaled on an axle in connection with ordinary truck now employed, with the wheels rigidly secured thereto.

To these ends my invention consists in an axle of suitable metal having a bulb or ball formed thereon near its ends, bearing-chucks surrounding and conforming in shape with said bulb, forming therewith a ball-and-socket joint, a sleeve or follower to embrace and inclose said joint, and means of securing the said sleeve to the wheel and of tightening the bearing-chucks around the sleeve or follower, in order to take up any wear on the bulb of the axle.

My invention further consists in combining with the ordinary truck and its journals for the axle wheels journaled on said axle and adapted to revolve thereon, whereby, when the wheels are traveling on the ordinary straight track, they can either revolve on the axle or the axle turn with the wheels in the bearings on the truck, and in passing around curves the outer wheels can move at a greater speed than the inner, while in case of the heating of either bearing another bearing is provided for the wheel and the necessity of stoppage of train on account of a "hot box" is done away with.

To enable others skilled in the art to make and use my invention, I will describe the same more fully, referring to the accompanying drawings, in which—

Figure 1 is a longitudinal central section showing the axle in full lines. Fig. 2 is a cross-section on the line $x$ $x$, Fig. 1. Fig. 3 is a perspective view of the sleeve or follower holding the bearing-chucks. Figs. 4 and 5 are like views of the bearing-chucks. Fig. 6 shows the manner of locking the nuts securing the follower to the wheel, and Fig. 7 is a longitudinal section of another form of my invention.

The axle $a$, of suitable metal, has formed or turned thereon, near its outer ends, the bulb or ball $a'$, and fitting around said bulb or ball are the bearing-chucks $b$, made of brass or other suitable bearing materials. These bearing-chucks $b$ have the inner concave faces $b'$, which correspond to and fit closely around the convex faces of the bulb $a'$, and so hold the wheel in proper position on the axle, preventing any longitudinal motion thereon, though permitting a slight swinging motion of the wheel on the axle, which motion is limited by the shoulders $a^2$ of the axle coming in contact with the end faces $b^2$ of the bearing-chucks $b$. Wings or projections $b^3$ are formed on the outside faces of the chucks $b$, and between said wings are the inclined or wedge faces $b^4$ in the form of a section of a truncated cone. A sleeve or follower $c$ has the flange $c'$ thereon and its interior provided with the seats $c^2$, corresponding in shape to each pair of adjoining wings $b^3$, so that the wing of one chuck and that of the adjoining one will be held in line with each other, said held seats $c^2$ leaving a space $e'$ between them, as hereinafter referred to, to permit the oil to flow to the bulb of the axle, while the interior projecting faces $c^3$ correspond to and fit against the inclined faces $b^4$, thereby locking the chucks $b$ securely in position, bolts $d$, passing through the body of the wheel and through the bolt-holes $d'$ in the flange $c'$ of the sleeve $c$, and secured by nuts $d^2$, hold said sleeve in position, and the chucks may be tightened around the bulb $a'$ by screwing up said nuts, the inclined faces $c^3$ of the sleeve $c$ pressing on the inclined faces $b^4$ of the chucks and pressing them against the bulbs of axles and so taking up all wear.

In order to lubricate the bulb $a'$, a port $e$, for the introduction of oil, is drilled in the boss $f$ of the wheel, this hole being drilled, preferably, at the center of the boss in the form of wheel shown in Fig. 7, and the oil passing through said port $e$ will find its way to the chucks $b$, and through the spaces $e'$ between said chucks to the bearing $a'$ and thoroughly lubricate the same. Where the ordinary bearings and axle-boxes used in the tight wheel and axle are employed in connection with my improved wheel journaled on the axle, as shown in Fig. 1, the axle-bearing $l$ is inclosed by the journal-box $m$, and is supported in the usual way, being journaled in the bearings $n$, so that if the bulb $a'$ becomes hot and the friction prevents it from revolving the car can still run on the bearing $l$, which will then come into play; or the axle may under ordinary circumstances run in the bearing $l$ of the truck, and the loose journal of the wheel simply act in connection therewith in turning curves, or where the box becomes hot. In this case ports $e$ for the oil are drilled at an angle into the boss $l$ of the wheel, said ports $e$ being so arranged as to lead into the spaces $e'$ between the several chucks $b$, so that the oil entering the ports $e$ will pass directly to the bearing-face of the bulb $a'$. The oil will fill up all the cracks and crevices between the chucks $b$ and the sleeve $c$, while an annular oil-space $k$ is left at the inside of the hub of the wheel, which is capable of holding sufficient quantity of oil to lubricate the wheel for a considerable period, and when the wheel is revolving the oil will automatically pour itself through the spaces $e'$ over the journal.

In order to secure a tight joint and prevent the escape of the oil, a rubber washer $g$ is inserted in a groove in the hub of the wheel and fits closely against the outer face of the sleeve $c$, this washer also excluding dust and dirt from the bearings. To lock the nuts $a^2$ on the sleeve or follower $c$, I employ a face-plate $h$, having the projections $h'$ and the depressions $h^2$ on its outer edge corresponding in number to the nuts $d^2$. The said plate $h$ is attached to the flange $c$ by set-screws $h^3$, fitting in the circular slots $h^4$ and adapted to slide to and fro in said slots, thereby giving a slight circular movement to the plate $h$ either way, so that when the projections $h'$ are opposite to and in contact with the nuts $d^2$ said nuts cannot move either way; but when the plate $h$ is moved so as to bring one of the depressions opposite to the nuts $d^2$ said nuts may be loosened or tightened, as desired.

The flange $c'$ of the sleeve $c$ has the seats $c^4$ in its outer periphery, into which corresponding lugs $i$ on the inner face of the wheel-hub enter, thus more securely holding the sleeve and relieving the bolts from all side strains, so that in running they are only subjected to the direct pressure of the bolts $d$.

When my improved wheel and axle is in use, the chucks $b$ are arranged about the bulb $a'$ of the axle, and the sleeve or follower $c$ is then forced over said chucks and locks them together in the manner above described, the sleeve fitting within the hub of the wheel and being secured in place by the bolts $d$. As the sleeve $c$ is forced in, it acts as a wedge and draws the chucks $b$ closer together and brings them into closer contact with the bulb $a'$, thus furnishing a means of taking up all the wear on said bulb and tightening the chucks around it. After the nuts have been tightened up, the face-plate $h$, to lock the nuts, is adjusted and oil is introduced into the port or ports $e$, which passes into the spaces $e'$ between the chucks $b$, into contact with the bearing $a'$, also filling the oil-space $k$, which will hold sufficient oil to lubricate the journal for some time. Where the wheel is journaled on the axle and the axle is journaled in the truck, which is the most desirable arrangement, if the car is traveling on a straight track the wheel can either turn on the axle or the axle on the truck, according to whichever journal runs more freely, and in case either journal becomes heated, as the other journal will then turn more freely, it will be brought into use, so permitting the heated journal to cool, and practically overcoming danger from hot boxes. When the car is passing around a curve, as the wheels are journaled on the axle the outer wheel can run more rapidly than the inner one, and therefore the wheels can travel around the curve without slipping on the rail, so overcoming the greatest amount of friction encountered in drawing the train, and consequently reducing the power necessary therefor. At the same time as the journal of the wheel on the axle permits a slight swinging or canting thereof the outer wheel can conform more perfectly to the rail, so reducing the friction between rail and wheel-flange. I am thus enabled to obtain a wheel which will run loosely on the axle and avoid the difficulties heretofore experienced where the straight bearing was used, as by the employment of the curved journal I not only enable the wheel to accommodate itself to the track, as above set forth, but I overcome the tendency of the hub of the wheel cutting into and wearing away the axle, while the canting of the wheel on the bearing does not alter the bearing-surface of the journal, as the chucks will fit around the curves of the bulb axle-bearing $a'$ in any position, thus causing the wear to be even and reducing it to a minimum and at the same time preventing the cutting of shoulders, the surface of the wheel, bearing, or axle-journal, since the wheel cannot move sidewise without wearing away the entire surface of the bearing-chucks or journal, thus forming a bearing having the least friction and requiring less oil to lubricate it. It is impossible for the wheel to slip or slide from the axle, as the curved surface of the bearing and the chucks always hold the wheel securely in place.

My improved wheel and axle has the special advantage in that it can be applied to the ordinary axle and truck heretofore used with the tight wheel with but little alteration in the same, and both bearings can be employed so, as above set forth, affording a means of overcoming the delay and trouble occasioned by the hot journal.

The parts composing my improvement are simple and few, and may easily be replaced by new ones when worn out.

What I claim as my invention, and desire to secure by Letters Patent, is—

1. The combination of a car-axle having a bulb or ball journal with a wheel mounted thereon, bearing-chucks corresponding in shape to and fitting around said bulb-journal, and a sleeve or follower secured to the wheel and holding said chucks in position, substantially as and for the purposes set forth.

2. The combination of a car-axle having a bulb or ball journal with a wheel mounted thereon, bearing-chucks corresponding in shape to and fitting around said journal and having wedge-faces on their outer sides, and a sleeve or follower secured to the wheel and holding said chucks in position, and provided with corresponding wedge-faces, whereby said chucks can be adjusted on said bearing, substantially as and for the purposes set forth.

3. The combination of the car-axle having the bulb-journal $a'$ and shoulders $a^2$ at each end thereof, with the wheel mounted thereon, the bearing-chucks corresponding in shape to and fitting around the bulb and having end faces $b^2$, and the sleeve or follower secured to the wheel and holding said chucks in position, substantially as and for the purposes set forth.

4. The combination of the axle having the bulb-journal $a'$, with a wheel mounted thereon, the chucks $b$, having the wings $b'$ and inclined faces $b^3$, the sleeve or follower $c$, having the seats $c^2$, and the projecting inclined faces $c^3$, adapted, respectively, to hold the said wings and press against said inclined faces, substantially as and for the purposes set forth.

5. The combination of the axle, the wheel-body having lugs $i$, the sleeve or follower $c$, having the flange $c'$, provided with seats $c^3$, the chucks $b$, bolts $d$, and nuts $d^2$, for tightening said chucks, substantially as and for the purposes set forth.

6. The combination, with a wheel having the bearing-chucks $b$, of the oil port or ports $e$, leading into the spaces $e'$ between the chucks $b$, substantially as and for the purposes set forth.

7. The combination, with a wheel having the bearing-chucks $b$, of the oil port or ports $e$, leading into the spaces $e'$ between the chucks $b$, and the annular oil-space $k$, substantially as and for the purposes set forth.

8. The combination, with an axle having a bulb-journal, a wheel mounted thereon, and the sleeve or follower $c$, of a locking-plate $h$, having projections $h'$ and depressions $h^2$ secured to the flange $c'$ by set-screws $h^3$, fitting in slots $h^4$ and adapted to move therein, and the nuts $d^2$, substantially as and for the purposes set forth.

In testimony whereof I, the said WILLIAM H. MELANEY, have hereunto set my hand.

WILLIAM H. MELANEY.

Witnesses:
   ROBT. D. TOTTEN,
   J. N. COOKE.